United States Patent [19]

Turtle

[11] Patent Number: 4,587,303
[45] Date of Patent: May 6, 1986

[54] POLYETHYLENE BLEND AND FILM
[75] Inventor: Brian L. Turtle, Linlithgow, Scotland
[73] Assignee: BP Chemicals Limited, London, England
[21] Appl. No.: 487,286
[22] Filed: Apr. 21, 1983
[30] Foreign Application Priority Data Apr. 27, 1982 [GB] United Kingdom ............... 8212185

[51] Int. Cl.$^4$ .................. C08L 23/06; C08L 23/18; C08L 23/20
[52] U.S. Cl. .................................. 525/240; 524/528
[58] Field of Search ......................................... 525/240

[56] References Cited

U.S. PATENT DOCUMENTS

| | | | |
|---|---|---|---|
| 3,176,052 | 3/1965 | Peticolas | 525/240 |
| 4,243,619 | 1/1981 | Fraser et al. | 264/40.6 |
| 4,337,188 | 6/1982 | Climenhage | 524/140 |
| 4,339,507 | 7/1982 | Kurtz et al. | 428/522 |

FOREIGN PATENT DOCUMENTS 2019412 10/1979 United Kingdom .
2077273 12/1981 United Kingdom .

Primary Examiner—Carman J. Seccuro
Attorney, Agent, or Firm—Brooks Haidt Haffner & Delahunty

[57] ABSTRACT

A blend having improved optical and good mechanical properties comprising (A) at least 75 weight %, preferably 85–95 weight %, of ethylene hydrocarbon copolymer (LLDPE) of density 0.916 to 0.930 manufactured by the transition metal catalyzed gas-fluidized bed process and (B) not less than 1 weight %, of low density polyethylene or ethylene copolymer made by the free radical catalyzed high pressure process. The LLDPE (A) is preferably ethylene/butene-1 or ethylene/hexene-1 copolymer. The high pressure polymer (B) is preferably an autoclave LDPE having a high die swell ratio and a MIR below 50.

7 Claims, No Drawings

POLYETHYLENE BLEND AND FILM

The present invention relates to blends of poly-1-olefins and to the use of such blends in the manufacture of film.

Conventional high pressure low density polyethylene (LDPE) has been employed for many years in the manufacture of useful articles using conventional fabrication techniques such as extrusion, injection moulding, blow moulding and film-blowing. LDPE has been particularly valuable in the manufacture of film and indeed a major proportion of the total world production of LDPE is used for this purpose.

More recently, processes have been developed for manufacturing linear copolymers of ethylene with propylene, 1-butene or higher 1-olefins to give a low density copolymer which has become known in the art as "linear low density polyethylene" (LLDPE). These copolymers can be manufactured relatively cheaply by low pressure processes employing, for example, Ziegler or Phillips polymerisation catalysts. An important process of this type involves the copolymerisation of ethylene with propylene, 1-butene or higher 1-olefins under gas phase fluidised bed polymerisation conditions using high activity catalysts. Generally the quantity of catalyst residues remaining in the produced LLDPE is so small that no catalyst removal step is required and the LLDPE can be used directly in conventional fabrication processes.

LLDPE manufactured by the gas phase fluidised bed process can be fabricated, for example by the film-blowing process, into film having good mechanical properties. However, LLDPE film manufactured by the conventional film blowing process is generally found to have optical properties, for example haze and gloss, which are inferior to the best optical grades of conventional LDPE.

It is known that the properties of polyolefins can be modified by blending together two or more polyolefins to produce a blend having a desired combination of properties. Blends of polyolefins of this type are, for example, disclosed in GB patent specification No. 1035887, GB patent application No. 2038845A and European patent application No. 6110.

GB patent specification No. 1035887 discloses a sheet structure, e.g. a film, formed from homogeneous blend of (1) 20% to 80%, based on the total weight of the blend, of polyethylene of density 0.910 to 0.925 gram/cc at 25° C., and (2) from 80% to 20%, based on the total weight of the blend, of a linear copolymer of 90-97% of ethylene and 10-3% of 1-butene, both by weight, of density 0.920 to 0.935 gram/cc at 25° C.

GB patent application No. 2038845A discloses a polyolefin composition capable of being used for the manufacture of film having cling properties, said composition consisting essentially of:

(a) an intimate mixture of 75-98 weight percent of a first component and 2-25 weight percent of a second component, and (b) at least 200 parts per million, based on the weight of (a), an agent selected from the class consisting of
 (i) an organic compound having at least one polar group and at least one group selected from the class consisting of alkylene and alkylene interrupted by oxygen, said alkylene having at least eight carbon atoms and said compound being a liquid or a waxy solid;
 (ii) mineral oil;
 (iii) a liquid polyolefin; and
 (iv) an organic phosphate ester that is a liquid or waxy solid; and mixtures of such agents wherein the first component is a polyethylene blend comprising 5-100 weight percent of at least one homopolymer of ethylene having a density in the range 0.915 to 0.930 g/cm$^3$ and melt index in the range 0.2 to 10 with 0-95 weight percent of at least one copolymer of ethylene and a $C_4$-$C_8$ alpha-olefin having a density in the range 0.915 to 0.930 g/cm$^3$ and melt index in the range 0.2 to 5.0 and wherein the second component is an elastomer selected from the group consisting of a copolymer of ethylene and propylene having a Mooney viscosity in the range 15 to 70 and a copolymer comprised of ethylene, propylene and a nonconjugated diene having a Mooney viscosity in the range 15 to 70.

European patent application No. 6110 discloses, inter alia, a film comprising a blend of (a) from about 1 to 20 weight percent of high pressure low density polyethylene having a melt index of about 0.2 to about 5.0; and (b) from about 99 to about 80 weight percent ethylene hydrocarbon copolymer having a density of about 0.915 to about 0.940.

It is an object of the present invention to provide a blend based on LLDPE which is suitable for the manufacture of film having improved optical properties whilst maintaining a good balance of mechanical properties.

Accordingly the present invention provides a blend comprising (A) at least 75 weight % of ethylene hydrocarbon copolymer (LLDPE) having a density in the range 0.916 to 0.930 and manufactured by a gas fluidised bed polymerisation process in the presence of a transition metal-containing coordination catalyst and (B) not less than 1 weight % of a polymer (hereinafter referred to as the "high pressure polymer") which is low density polyethylene or an ethylene copolymer containing not more than 15 mole % of copolymerised comonomer, the high pressure polymer having been manufactured by the high pressure free radical process and having a melt index (ASTM D-1238, condition E, measured at 190° C. in units of grams per 10 minutes) greater than 6 and not greater than 20.

The LLDPE employed in the blend of the present invention is suitably a copolymer of ethylene with one or more higher 1-olefins which are straight chain 1-olefins or contain no branching nearer than the fourth carbon atom. Examples of suitable higher 1-olefins are propylene, 1-butene, 1-pentene, 4-methyl-1-pentene, 1-hexene, 1-octene, 1-decene and 1-dodecene. Preferred higher 1-olefins are 1-butene, 1-octene and 4-methyl-1-pentene. 1-Butene is particularly preferred.

Methods for manufacturing ethylene hydrocarbon copolymer (LLDPE) by gas-fluidised bed polymerisation processes are well known in the prior art and for details of such processes reference may be made to, for example, UK Patent Application GB No. 2006232A and to European Patent Application No. 4645. The catalyst employed in making the ethylene hydrocarbon copolymer employed in the present invention can be, for example, a Phillips or a Ziegler catalyst. Preferred catalysts are Ziegler catalysts comprising a titanium compound supported on or complexed with a magnesium halide (for example magnesium chloride) and activated with a conventional Ziegler catalyst activator, for example a trialkyl aluminium compound or an alkylaluminium halide.

The LLDPE employed in the blend of the present invention preferably has a melt index in the range 0.1 to 2.1, for example 0.3 to 2.0, more preferably 0.5 to 1.0. The density of the LLDPE is preferably in the range 0.916 to 0.924 (as measured by ISO 1872, Annex A).

The LLDPE employed in the present invention preferably has a narrow molecular weight distribution, for example the ratio Mw/Mn is preferably below 6 and is most preferably in the range 2.8 to 4.0.

The high pressure polymer employed in the blend of the present invention can be manufactured, for example, by the stirred autoclave process or the tubular reactor process which are both well known in the art in the manufacture of low density polyethylene. The pressure employed in such processes is preferably at least 500 bars, most preferably at least 1000 bars. The high pressure polymer can be, for example, conventional low density polyethylene or ethylene copolymer manufactured using air or peroxide as free radical initiator. Examples of "high pressure" ethylene copolymers suitably employed in the present invention are ethylene/vinyl acetate, ethylene/methyl acrylate and ethylene/ethyl acrylate copolymers. When ethylene copolymers are employed as the high pressure polymer in the present invention they preferably contain not more than 2 moles %, most preferably not more than 1 mole % of copolymerised comonomer. The preferred high pressure polymer employed in the present invention is an ethylene homopolymer. Preferred grades of high pressure polymer have a melt index in the range 7-15, most preferably in the range 7-10. It is preferred to employ grades of high pressure polymer having a relatively narrow molecular weight distribution. These grades are most readily manufactured in high pressure stirred autoclave batch reactors. The high pressure polymer preferably has a density in the range 0.912-0.918.

The high pressure polymer employed in the present invention preferably has a relatively high die swell ratio (as herein defined). The die swell ratio is preferably at least 1.50, more preferably at least 1.55 and is most preferably at least 1.65. Ethylene homopolymer having a relatively high die swell ratio can be manufactured for example using the stirred autoclave process. The high pressure polymer preferably has a melt index ratio (as herein defined) below 50.0 and most preferably below 37.0.

The blend of the present invention preferably consists of 75-99 weight % of the defined LLDPE, the balance to 100 weight % being met entirely by the defined high pressure polymer. However, the presence in the blend of up to 5 weight % of other compatible hydrocarbon polymers is not excluded from the scope of the present invention.

The blend of the present invention preferably comprises 80-95 weight %, most preferably 86-92 weight % of LLDPE, the balance in each case being met by the defined high pressure polymer. A particularly preferred blend consists of 88-92 weight % of an LLDPE comprising ethylene/butene-1 copolymer and 12-8 weight % of low density 'autoclave' polyethylene having a melt index of 7-9.

In a preferred embodiment of the present invention the blend is free from or is substantially free from additives conventionally employed to impart cling properties to a film produced therefrom. Examples of cling additives known in the art are mineral oil, liquid poly-olefin (e.g. polyisobutene), organic phosphate esters and liquid carboxylic acid esters. If the blend contains any cling additive it is preferably present in an amount less than 200 parts per million, most preferably less than 50 parts per nillion of cling additive based on the total blend.

The blend of the present invention may be compounded together with conventional antioxidants, processing aids, pigments, antistatic agents and antiblock agents.

The blend of the present invention can be fabricated into film material having good optical and mechanical properties using the film-blowing process. The blend shows improved extrudability compared with the unblended LLDPE, for example the extruder head pressure is lower and the melt pressure (for a given die gap) is reduced.

The invention is illustrated by reference to the following Examples and Comparative Test wherein the melt extrusion and film blowing conditions were the same in each case. Extrusion was carried out on 60 mm, 20:1 length/diameter general engineering extruder with 150 mm Bone Craven die and air ring. Extrusion in each case was carried out using the same temperatures, screw speed and rate of film cooling.

Comparative Test

An LLDPE resin (ethylene/butene-1 copolymer) made by the gas phase process of melt index 1.0 g/10 min, density 0.920 was fed to an extruder, (60 mm diameter, 20:1 length/diameter ratio) and extrusion-blown into 40 micron film at a blow ratio of 2:1.

The film had the following properties:
Haze: 12%
Gloss: 47 gloss units
Impact strength: 150 g

EXAMPLE 1

In this Example the same LLDPE resin as used in the Comparative Test was dry-blended with 17% of an LDPE resin made by the high pressure autoclave process. The LDPE resin had MI of 7.8 dg/min, density 0.915 g/cc, die swell ratio 1.67 and melt index ratio (MIR) 31.4. The dry blend was extrusion-blown into 40 micron film as described above.

The film had the following properties:
Haze: 4.5%
Gloss: 76 gloss units
Impact strength: 140 g

EXAMPLE 2

In this Example the same LLDPE resin as in the Comparative Test was dry-blended with 17% of an LDPE resin made by the high pressure tubular process of MI 7.4 dg/min, density 0.917 g/cc, die swell ratio 1.50 and MIR 41.5.

The film had the following properties:
Haze: 7.5%
Gloss: 64 gloss units
Impact strength: 130 g

EXAMPLE 3

In this Example an LLDPE resin (ethylene/butene-1 copolymer) made by the gas phase process of melt index 0.75 dg/min, 0.919 g/cc density was dry-blended with 10% of an LDPE resin made by the high pressure autoclave process of MI 16 dg/min, density 0.914, die swell ratio 1.76 and MIR 33.0.

The film had the following properties:

Haze: 6.5%
Gloss: 67 gloss units
Impact strength: 140 g

It can be seen that the haze and gloss of the films produced from the blend in accordance with the present invention (Examples 1–2) are superior to film produced from unblended LLDPE (Test 1), and the impact strength has only been reduced to a relatively minor extent. Example 3 illustrates the blend of the invention using a different grade of LLDPE.

In the Examples the following test methods were used.

Haze—ASTM D 1003-61 (1977) Procedure A
Gloss (45°)—ASTM D 2457-70 (1977)
Impact strength—ASTM D 1709-75 (1980)
Melt Index—ASTM D 1238, Condition E
Density—ISO 1872, Annex A.

Melt index ratio (MIR) is defined as the ratio of the melt index measured under condition F to the melt index measured under condition E of ASTM D 1238.

Die Swell ratio—the melt flow rate procedure is carried out as in ASTM D 1238 condition E but with a plastometer temperature of 130° C. instead of 190° C. The melt extrudates are allowed to cool to room temperature in a draught free environment. The average diameter of the cooled extrudate is measured at a point 5 mm back from the leading edge. The values for five samples are averaged. The ratio of the average extrudate diameter to the diameter of the plastometer die orifice is the die swell ratio.

I claim:

1. A self-supporting film fabricated from a blend essentially consisting of
   (A) 80 to 95 weight % of ethylene hydrocarbon copolymer (LLDPE) having a density in the range 0.916 to 0.924 and manufactured by a gas-fluidised bed polymerisation process in the presence of a transition metal-containing coodination catalyst and
   (B) from 5 to 20 weight % of high pressure polymer which is low density polyethylene or an ethylene copolymer containing not more than 15 moles % of copolymerised comonomer, the high pressure polymer having been manufactured by the high pressure free radical process and having a melt index (ASTM D-1238, condition E, measured at 190° C. in units of grams per 10 minutes) in the range of 7 to 15, said high pressure polymer having a die swell ratio of at least 1.65, and said film having a haze of not more than 6.5%.

2. A blend as claimed in claim 1 wherein the ethylene hydrocarbon copolymer is a copolymer of ethylene with 1-butene, 1-octene or 4-methyl-1-pentene.

3. A blend as claimed in claim 1 wherein the ethylene hydrocarbon copolymer has a melt index in the range 0.3 to 2.0.

4. A blend as claimed in claim 1 wherein the high pressure polymer is low density polyethylene.

5. A blend as claimed in claim 1 wherein the high pressure polymer is manufactured in a stirred autoclave process.

6. A blend as claimed in claim 1, wherein the high pressure polymer has a melt index in the range of 7 to 10.

7. A self-supporting film fabricated from a blend essentially consisting of
   (A) 80 to 95 weight % of ethylene hydrocarbon copolymer (LLDPE) having a density in the range 0.916 to 0.924 and manufactured by a gas-fluidised bed polymerisation process in the presence of a transition metal-containing coordination catalyst,
   (B) from 5 to 20 weight % of high pressure polymer which is low density polyethylene or an ethylene copolymer containing not more than 15 moles % of copolymerised comonomer, the high pressure polymer having been manufactured by the high pressure free radical process and having a melt index (ASTM D-1238, condition E, measured at 190° C. in units of grams per 10 minutes) in the range of 7 to 15, said high pressure polymer having a die swell ratio of at least 1.65, and said film having a haze of not more than 6.5%, and
   (C) at least one additive selected from the group consisting of a cling additive, an antioxidant, a processing aid, a pigment, an antistatic agent and an antiblock agent.

* * * * *

UNITED STATES PATENT AND TRADEMARK OFFICE
CERTIFICATE OF CORRECTION

PATENT NO. : 4,587,303
DATED : May 6, 1986
INVENTOR(S) : BRIAN L. TURTLE

It is certified that error appears in the above-identified patent and that said Letters Patent is hereby corrected as shown below:

Col. 5, Claim 1, "coodination" should read --coordination--

Signed and Sealed this

Fourteenth Day of October, 1986

[SEAL]

Attest:

DONALD J. QUIGG

Attesting Officer

Commissioner of Patents and Trademarks